US009772950B2

(12) United States Patent
Solihin

(10) Patent No.: US 9,772,950 B2
(45) Date of Patent: Sep. 26, 2017

(54) MULTI-GRANULAR CACHE COHERENCE

(71) Applicant: Empire Technology Development LLC, Wilmington, DE (US)

(72) Inventor: Yan Solihin, Raleigh, NC (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 98 days.

(21) Appl. No.: 14/437,331

(22) PCT Filed: Oct. 25, 2012

(86) PCT No.: PCT/US2012/061907
§ 371 (c)(1),
(2) Date: Apr. 21, 2015

(87) PCT Pub. No.: WO2014/065802
PCT Pub. Date: May 1, 2014

(65) Prior Publication Data
US 2015/0286577 A1 Oct. 8, 2015

(51) Int. Cl.
*G06F 12/0897* (2016.01)
*G06F 12/0813* (2016.01)
(Continued)

(52) U.S. Cl.
CPC ...... *G06F 12/0897* (2013.01); *G06F 12/0813* (2013.01); *G06F 12/0815* (2013.01);
(Continued)

(58) Field of Classification Search
CPC ............. G06F 12/0897; G06F 12/0813; G06F 12/0815; G06F 12/0826
See application file for complete search history.

(56) References Cited

U.S. PATENT DOCUMENTS 7,805,575 B1 * 9/2010 Agarwal ............. G06F 12/0811
711/141
2010/0274971 A1 10/2010 Solihin
(Continued)

OTHER PUBLICATIONS

Cantin, J.F., "Coarse-Grain Coherence Tracking," Ph.D Dissertation, University of Wisconsin-Madison, pp. 1-179 (2006).
(Continued)

*Primary Examiner* — Eric S Cardwell
(74) *Attorney, Agent, or Firm* — Moritt Hock & Hamroff LLP; Steven S. Rubin, Esq.

(57) ABSTRACT

Technologies are generally described for methods and systems effective to maintain coherence in a multi-core processor on a die. In an example, a method for processing a request for a particular block in a particular region may include analyzing, by a first processor, a first cache to determine whether there is a block indicator in the first cache associated with the particular block. The method may further include when the first processor determines that the block indicator is not present in the first cache, analyzing, by the first processor, the first cache to determine whether there is a region indicator associated with the particular region. The method may further include when the first processor determines that the region indicator is not present in the first cache, the method further includes sending, by the first processor, the request to the directory in the tile.

24 Claims, 6 Drawing Sheets

(51) Int. Cl.
*G06F 12/0815* (2016.01)
*G06F 12/0817* (2016.01)

(52) U.S. Cl.
CPC .. *G06F 12/0826* (2013.01); *G06F 2212/1008* (2013.01); *G06F 2212/1024* (2013.01); *G06F 2212/251* (2013.01); *G06F 2212/301* (2013.01)

(56) References Cited

U.S. PATENT DOCUMENTS

| | | | |
|---|---|---|---|
| 2011/0138128 A1 | 6/2011 | Chen et al. | |
| 2011/0161596 A1* | 6/2011 | Conte | G06F 12/0817 711/130 |
| 2013/0073811 A1* | 3/2013 | Beckmann | G06F 12/0817 711/141 |
| 2013/0097385 A1* | 4/2013 | Beckmann | G06F 12/084 711/128 |

OTHER PUBLICATIONS

Cantin, J.F., et al., "Coarse-Grain Coherence Tracking: Regionscout and Region Coherence Arrays," IEEE Micro, vol. 26, Issue 1, pp. 70-79 (Jan.-Feb. 2006).

Cantin, J.F., et al., "Improving Multiprocessor Performance with Coarse-Grain Coherence Tracking," Proceedings of the 32nd International Symposium on Computer Architecture (ISCA), pp. 1-12, (2005).

Cuesta,B., "Increasing the effectiveness of directory Caches by deactivating coherence for private memory blocks," 38th Annual International Symposium on Computer Architecture (ISCA) 2011, pp. 93-104 (Jun. 4-8, 2011).

Hardavellas, N., et al., "Reactive NUCA: Near-Optimal Block Placement and Replication in Distributed Caches," Proceedings of the 36th Annual International Symposium on Computer Architecture (ISCA'09), Austin, TX, pp. 184-195, (Jun. 2009).

International Search Report and Written Opinion for International Patent Application No. PCT/US12/61907 mailed Mar. 21, 2014, 22 pages.

Moshovos, A., "RegionScout: Exploiting Coarse Grain Sharing in Snoop-Based Coherence," Proceedings of the 32nd Annual International Symposium on Computer Architecture (ISCA), pp. 1-12 (2005).

Suh, T., et al., "Cache Coherence Support for Non-Shared Bus Architecture on Heterogeneous MPSoCs," Proceedings 42nd Design Automation Conference, 2005, pp. 1-6 (Jun. 13-17, 2005).

* cited by examiner

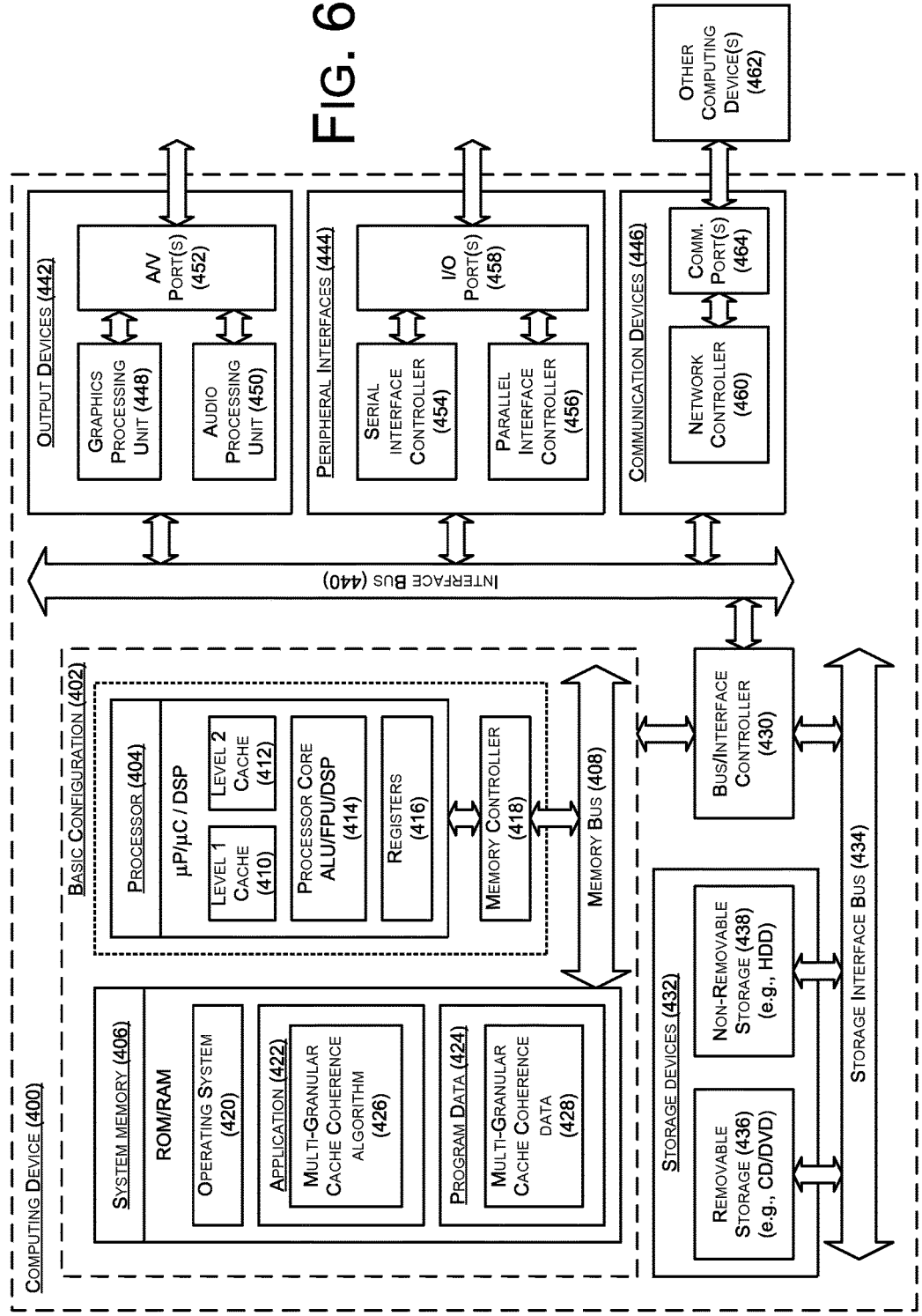

MULTI-GRANULAR CACHE COHERENCE

CROSS-REFERENCE TO RELATED APPLICATION

This application is the U.S. National Stage filing under 35 U.S.C. §371 of International Application Ser. No. PCT/US12/61907, filed on Oct. 25, 2012. The disclosure of the International Application is hereby incorporated herein by reference in its entirety.

BACKGROUND

Unless otherwise indicated herein, the materials described in this section are not prior art to the claims in this application and are not admitted to be prior art by inclusion in this section.

In multi-core processor architectures, multiple processor cores may be included in a single integrated circuit die or on multiple integrated circuit dies that are arranged in a single chip package. A cache may be used to store data for access by one or more of the processor cores. The data can be a subset of data stored in a larger memory that is typically located outside of the die. Each processor may be provided with a cache that stores data for the processor. As a single piece of data may be stored in multiple caches, a cache coherence protocol may be configured to keep track of the data stored in multiple caches. The cache coherence protocol may be configured to help ensure that multiple requests for data consistently result in the same data being returned.

SUMMARY

In some examples, a die in a multi-core processor architecture is generally described. The die may include a first tile, a second tile and a directory controller. The first tile may include a first cache and a first processor core. The first tile may be configured to store a particular block and a region of blocks. The second tile may be configured in communication with the first tile. The second tile may include a second cache and a second processor core. The directory controller may be configured in communication with the first and the second tile. The directory controller may be effective to control a directory for the die. The directory controller may be configured to determine a block level coherence state associated with the particular block. The directory controller may be configured to determine a region level coherence state associated with the region of blocks. The directory controller may further be configured to communicate to the first tile the block level coherence state of the particular block and the region level coherence state of the region of blocks. The first tile may be configured to receive the block level coherence state and the region level coherence state from the directory controller. The first tile may be further configured to identify the block level coherence state of the particular block and the region level coherence state of the region of blocks. The first tile may be configured to store the block level coherence state associated with the particular block in the first cache and the region level coherence state in association with the region of blocks in the first cache.

In some examples, a method for maintaining coherence in a multi-core processor is generally described. The die may include a first tile including a first cache and a first processor core. The die may further include a second tile configured in communication with the first tile. The second tile may include a second cache and a second processor core. The die may include a memory storing a directory configured in communication with the first tile and the second tile. The method may include determining, by a directory controller, a block level coherence state associated with a particular block stored in the first tile. The method may include determining, by the directory controller, a region level coherence state associated with a region of blocks stored in the first tile. The method may further include communicating, by the directory controller to the first tile, the block level coherence state and the region level coherence state. The method may include receiving, by the first tile, the block level coherence state and the region level coherence state from the directory controller. The method may further include identifying the block level coherence state of the particular block and the region level coherence state of the region of blocks. The method may further include storing the block level coherence state associated with the particular block in the first cache and the region level coherence state in association with the region of blocks in the first cache.

In some examples, a method for processing a request for a particular block in a particular region in a multi-core processor on a die is generally described. The die may include a first tile including a first cache and a first processor. The die may further include a second tile configured in communication with the first tile. The second tile may include a second cache and a second processor. The die may include a memory storing a directory configured in communication with the first tile and the second tile. The method may include analyzing, by the first processor, the first cache to determine whether there is a block indicator in the first cache associated with the particular block. The method may include when the first processor determines that the block indicator is not present in the first cache, analyzing, by the first processor, the first cache to determine whether there is a region indicator associated with the particular region. The method may further include when the first processor determines that the region indicator is not present in the first cache, sending, by the first processor, the request to the directory in the tile.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 is a block diagram illustrating an example computing device that is arranged to implement multi-granular cache coherence, all arranged according to at least some embodiments described herein.

DETAILED DESCRIPTION

Figure 1:
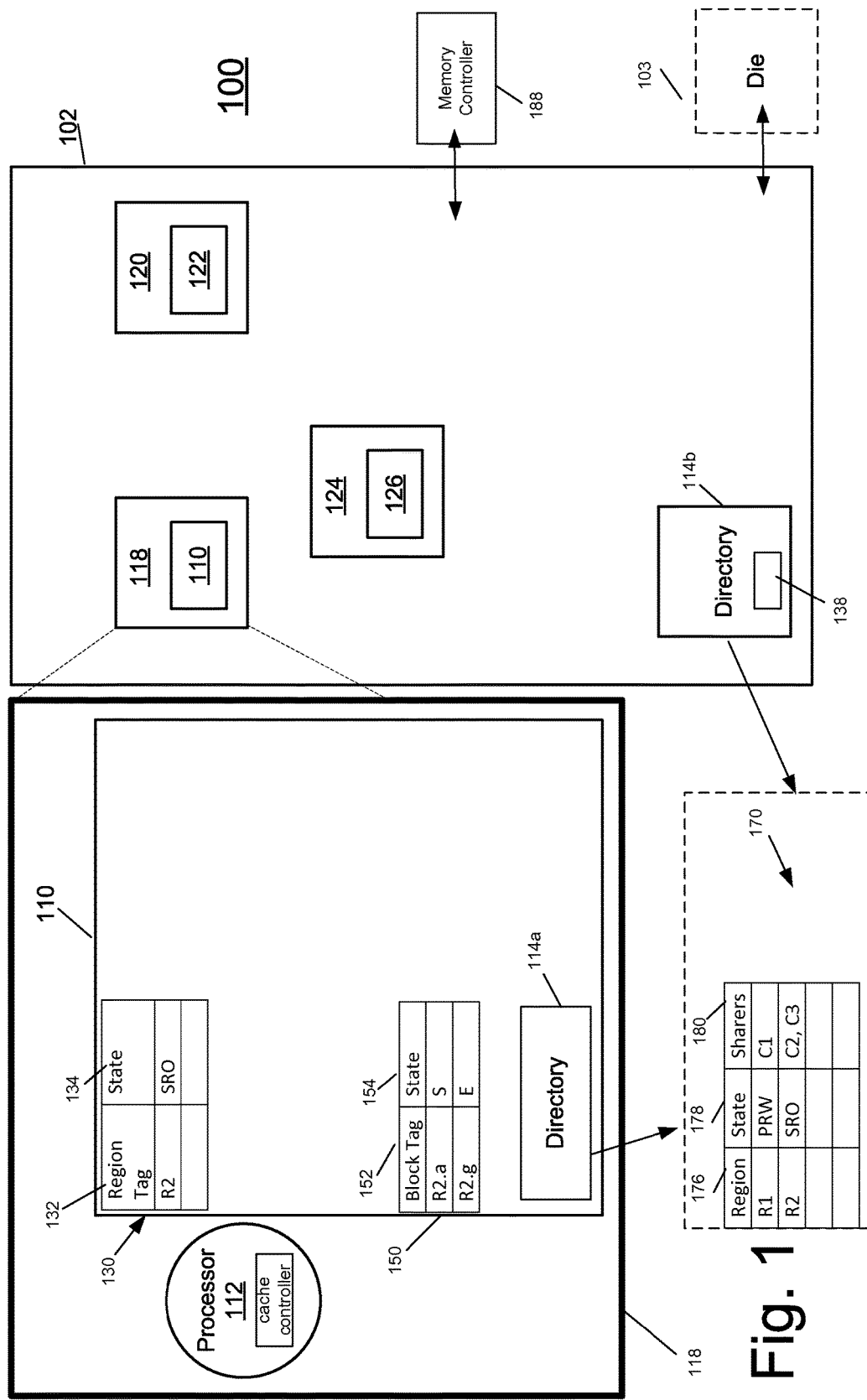
FIG. 1 illustrates an example system that can be utilized to implement multi-granular cache coherence.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to multi-granular cache coherence.

Briefly stated technologies are generally described for methods and systems effective to maintain coherence in a multi-core processor on a die. In an example, a method for processing a request for a particular block in a particular region may include analyzing, by a first processor, a first cache to determine whether there is a block indicator in the first cache associated with the particular block. The method may further include when the first processor determines that the block indicator is not present in the first cache, analyzing, by the first processor, the first cache to determine whether there is a region indicator associated with the particular region. The method may further include when the first processor determines that the region indicator is not present in the first cache, the method further includes sending, by the first processor, the request to the directory in the tile.

FIG. 1 illustrates an example system that can be utilized to implement multi-granular cache coherence arranged in accordance with at least some embodiments described herein. An example system 100 may include a die 102 including a plurality of tiles 118, 120 and/or 124. Focusing on tile 118 for illustration, each tile 118 may include a cache 110, a processor or processor core, including a cache controller, (hereinafter referred to as "processor") 112, and/or a directory 114 (including 114a and/or 114b). Processor 112 may be adapted to process data including code (hereinafter both data and code referred to as "data block"). Cache 110 may be configured to store data blocks local to processor 112.

In addition to tile 118, die 102 may include two or more additional tiles 120, 124 including respective caches 122, 126. Each tile in die 102 may be substantially the same as in a homogenous arrangement or some tiles may be different as in a heterogeneous arrangement. Die 102 may be arranged in communication with another die 103 so that data may be shared among a plurality of dies.

As described in more detail below, die 102 may be adapted to store coherence information on both a block level and a region level. When requests are made for a particular block, a tile may be configured to analyze a block level coherence granularity and then analyze a region level coherence granularity before deciding whether to send a request for a block to the directory or to a memory controller.

Directory 114 may include a directory controller 138 and may be located in a single tile on die 102 as shown at 114b or distributed among many or all tiles as shown at 114a. If directory 114 is distributed, for example, a first range of addresses (such as 0x0000-0x1000) may be stored in a first tile, a second range of addresses (such as 0x1001-0x2000) stored in a second tile, etc. Directory 114 in the figure thus may illustrate a first portion of an entire die directory where that first portion may be stored in tile 118 and additional portions may be stored in other tiles such as tiles 120, 124, etc.

Directory controller 138 may be configured to monitor traffic on die 102 and assign and store information relating to a coherence state of a region of blocks in die 102. Directory controller 138 may be configured to send a message including the coherence states to respective tiles so that subsequent requests for blocks may be processed without communicating with directory 114. A region may be, for example, two or more blocks such as 2×64 bytes. In an example, a region may be in a range between about 512 B and about 16 KB, such as 4 kb and may correspond to a page in a memory. The coherence state of a region may be determined based on the states of blocks in the region. Region protocol states may include, for example.

PRO (private, read-only) which may indicate that blocks in the region may be stored in a cache, or not stored, and a tile may be permitted to read from any block in the region but not write to any block;

SRO (shared, read-only) which may indicate that any block in the region may be stored in one cache, not stored, or stored in multiple caches with a read-only permission;

PRW (private, read/write) which may indicate that all blocks in a region may be stored in a cache, or not stored, and the tile is permitted to read from or write to any block;

MX (mixed) which may indicate that blocks have a non-uniform sharing or access permission and so the region state may not be helpful and a block level coherence may be used; or RU (region un-cached) which may indicate that no block in the region is currently cached.

Directory 114 may include a region coherence table 170 identifying coherence states of regions of blocks. Region coherence table 170 may include a region field 176, a state field 178 and/or a sharers field 180. In an example, if blocks in a region are indicated as having a coherence state of shared S and/or exclusive shared as illustrated in FIG. 1 for blocks in region R2, a coherence state of region R2 may be SRO (shared, read only). Directory 114 may be configured to store a coherence state of regions in die 102 for at least two caches. When a region coherence state changes, as discussed herein, directory controller 138 may be configured to send a message to corresponding caches, identified in the sharers field 180, to update the respective region coherence table.

With continuing focus on tile 118 for illustration, cache 110 may include a block coherence table 150 identifying coherence states at a block level. Block coherence table 150 may include a tag field 152 and/or a state field 154. Tag field 152 may include an indicator associated with a tag for a particular block. State field 154 may include an indicator associated with a coherence state for the block in the corresponding tag field.

Cache 110 may further be configured to include a region coherence table 130 identifying coherence states of regions of blocks. Region coherence table 130 may include a region tag field 132 and/or a state field 134. Region tag field 132 may include an indicator associated with a region of blocks that may be stored in cache 110 of tile 118. State field 134 may include an indicator associated with a coherence state of the region identified in region tag field 132 as described above and may relate to a coherence state of blocks in the region stored in tile 118 and a coherence state of blocks in the region stored in other caches.

In an example, based on coherence states of blocks in a region, a region's coherence state may be assigned by directory controller 138 and stored in region coherence tables 130 and 170. As coherence status for regions may be assigned by the directory controller, the directory may subsequently be bypassed in subsequent requests for data blocks.

In an example, tile 118 may generate a request for a particular data block in region R1. Processor 112 of tile 118 may first analyze block coherence table 150 and experience a cache miss indicating that the particular data block is not stored in the cache for tile 118. Processor 112 may then analyze region coherence table 130 and determine that region R1 is stored in a PRW coherence state indicating that any blocks of region R1 may be stored in the cache for tile 118 because the state is P (private). As the state for region R1 is PRW, and tile 118 experienced a cache miss when analyzing block coherence table 150, the particular data block is likely not stored in die 102. Processor 112 may send the request for the particular data block to memory controller 188 which may be inside or outside of die 102, bypassing directory 114.

When searching for a block in cache, processor 112 in tile 118 may be configured to analyze block coherence table 150 first and, if the particular block is not identified in the block coherence table, processor 112 may then analyze region coherence table 130. Block coherence table 150 may represent a first coherence granularity and region coherence table 130 may represent a second coherence granularity. Directory 114 need not be involved in the above described requests for blocks in cache thereby reducing latency and traffic in die 102.

Figure 2:
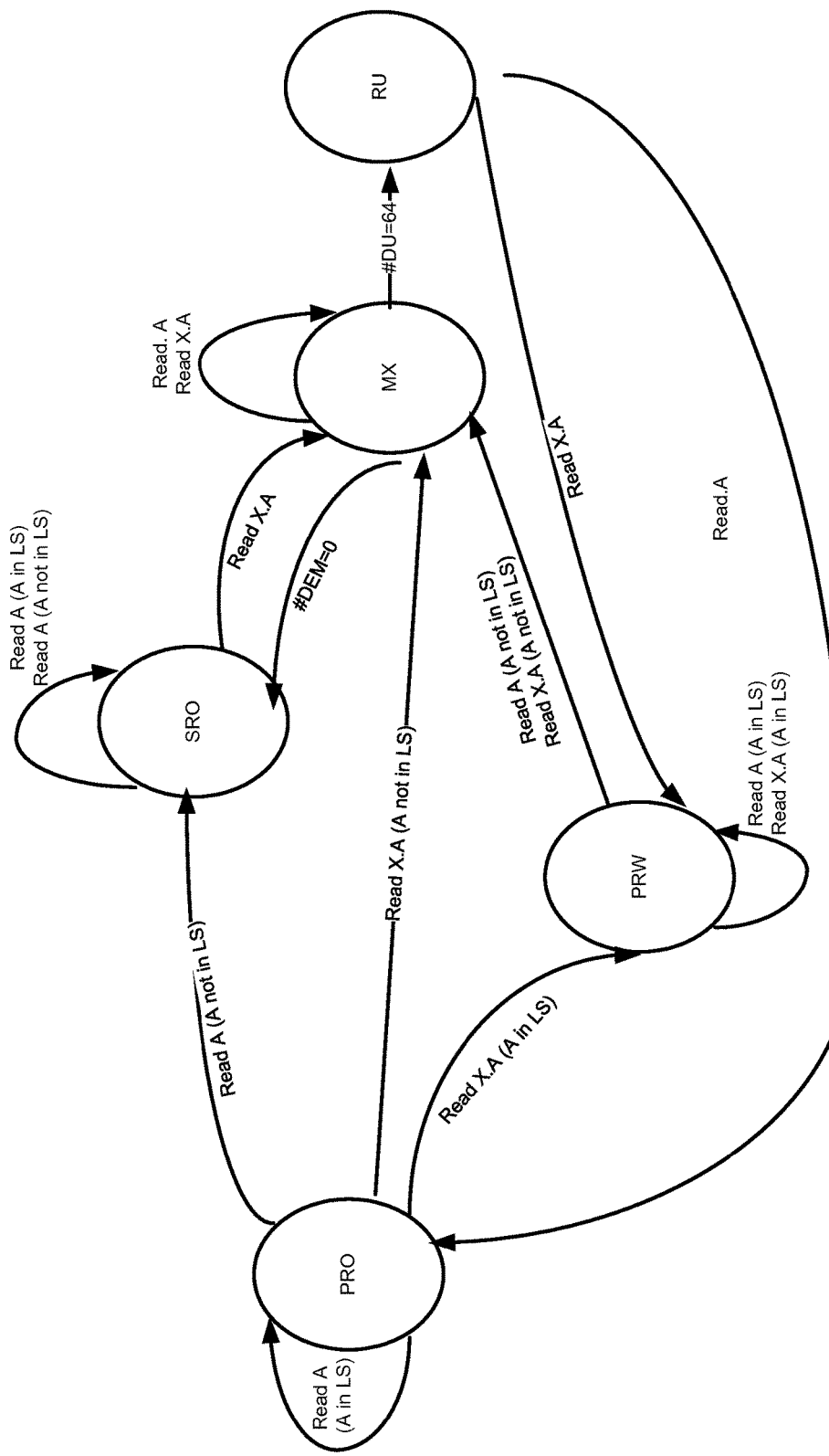
FIG. 2 illustrates a coherence state transition diagram that may be used to implement multi-granular cache coherence.

FIG. 2 illustrates a coherence state transition diagram that may be used to implement multi-granular cache coherence arranged in accordance with at least some embodiments described herein. Coherence state transition may be controlled by directory controller 138 based on events relating to requests to read from or write to blocks in a region. Directory controller 138 may send messages to relevant tiles when coherence states of regions shared by the tiles have been changed and may wait for an acknowledgement from the relevant tiles that their respective region coherence tables have been updated before servicing subsequent requests for data blocks.

As illustrated in FIG. 2, in an example, regions may assume one or more of the above described coherence states PRO, SRO, MX, RU, and/or PRW Changes in a coherence state are illustrated based on requests to read a block by a tile A ("Read A") and to write to a block by tile A ("Read X.A"). Cache coherence information may start in state RU where regions are indicated as being un-cached. From state RU, if a request is made to read data in the region, directory controller 138 may transition the region coherence state to PRO. If a request is made to write data in the region, as illustrated by "X" in FIG. 2, directory controller 138 may transition the coherence state to PRW.

At state PRO (private, read-only), requests to read blocks in the region by tiles in the list of shared tiles (illustrated by "LS" in FIG. 2) maintains a coherence state of PRO. A request to read from the region by a tile outside of the shared tiles may cause a transition to state SRO. A request to write to the region from a tile outside of the shared tiles may cause a transition to MX. A request to write to the region from a tile among the shared tiles may cause a transition to PRW.

At state PRW (private read-write), a request to read from blocks in the region by a tile outside of the shared tiles may cause a transition to state MX. A request to read or write to the region from a tile outside of the shared tiles may cause a transition to MX. A request to read or write to the region from a tile among the shared tiles may maintain a state of PRW. At state SRO (shared, read-only), read requests maintain a state of SRO. A write request may cause a transition to state MX.

Once in the MX state, a block level coherence protocol may be used as the blocks in the region do not have a uniform coherence state. Once in the state MX, directory controller 138 may keep track of, and analyze additional information to determine when a state transition should occur to change the MX status. Directory 114 may be configured to store information relating to the number of blocks that are exclusive or modified (DEM) or not cached in any memory (DU). For example, if a region has 64 blocks and DU=64 indicating that all 64 blocks are not cached, directory controller 138 may transition the state of the region from MX to RU. In an example, if DEM=0 indicating that no blocks in the region have been modified, directory controller 138 may transition the state of the region to state SRO. In an example, directory controller 138 may be configured to wait a period of time, such as between a 200 and 10,000 clock cycles between a determination that DU indicates all blocks are not cached, and causing a state transition to RU.

In examples where the region coherence status remains unchanged, the directory need not be informed of requests to read and/or write to blocks. For example, in the PRW state, a request by tile A to read a block or write to a block, where A is among the list of shared caches, may be processed without communicating with the directory. Similarly, in the SRO status, a request by tile A to read a block, whether or not block A is in the list of shared caches, need not result in communication with the directory.

Figure 3:
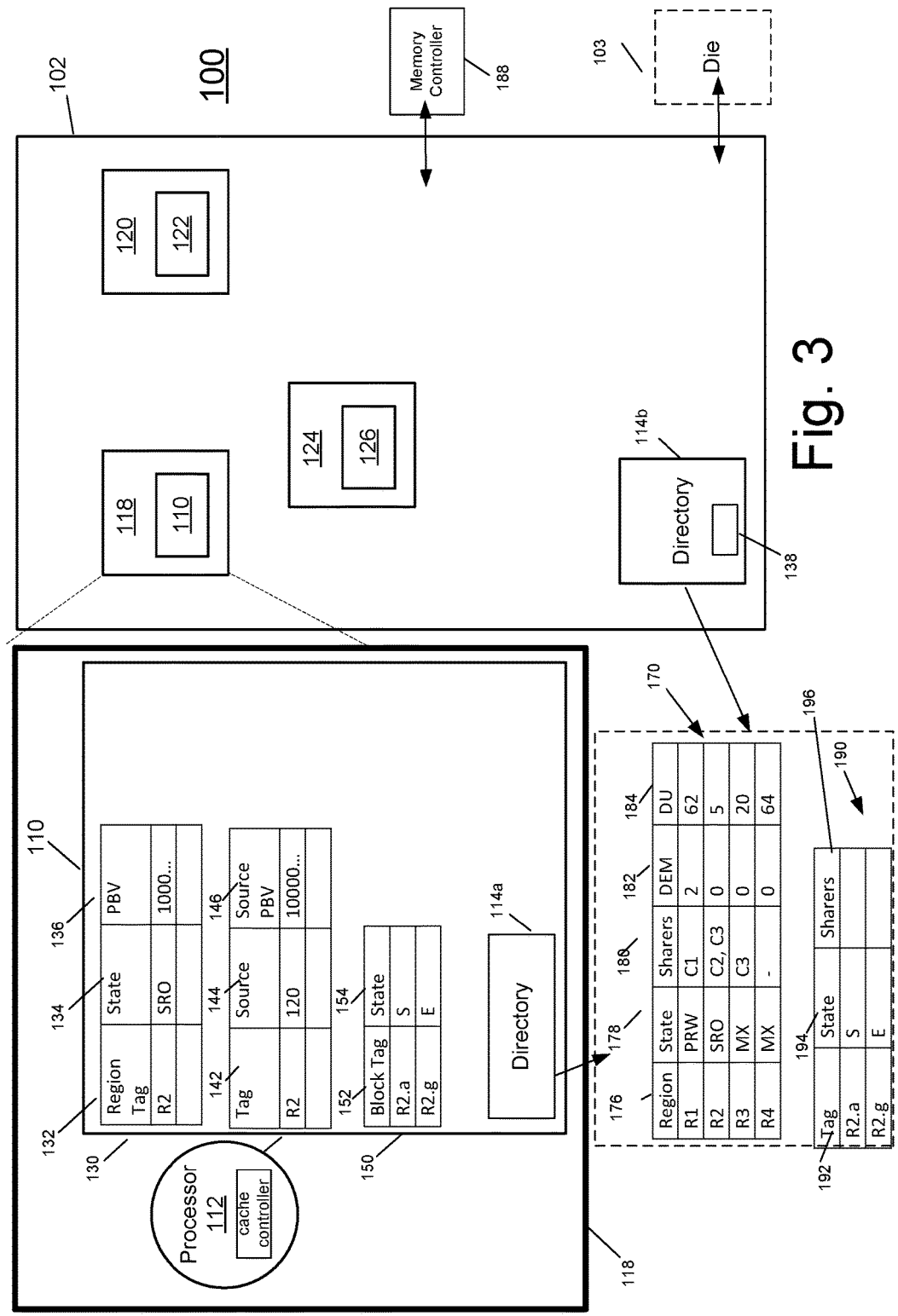
FIG. 3 illustrates an example system that can be utilized to implement multi-granular cache coherence.

FIG. 3 illustrates an example system that can be utilized to implement multi-granular cache coherence arranged in accordance with at least some embodiments described herein. FIG. 3 is substantially similar to system 100 of FIG. 1, with additional details. Those components in FIG. 3 that are labeled identically to components of FIG. 1 will not be described again for the purposes of clarity.

As shown in FIG. 3, region coherence table 170 may further include a DEM field 182 and/or a DU field 184. As discussed above, these fields may be used to store information indicating when directory controller 138 should transition a region out of coherence state MX.

Region coherence table 130 in cache 110 may further be adapted to include a presence bit vector 136. Presence bit vector 136 may indicate the blocks of the respective region that are currently cached in the particular tile. For example, a presence bit vector of 100000 may indicate that the first block of the region is stored in the cache of the particular tile—as indicated by a "1" in the first bit of the vector. Over time, as blocks in the region are stored in the cache of the tile, the processor may set or change the corresponding bit vectors to indicate that those respective blocks are stored in the cache. In an example, in a 64 block region, 64 bits may be used for the presence bit vector.

In an example, tile 118 may require a particular block in region R2 that is not cached in tile 118. Tile 118 may send a request to directory 114 for the particular block and receive the particular block from tile 120. Along with the particular block, tile 120 may further send the presence bit vector 136 of tile 120 based on instructions from directory controller 138. Now tile 118 knows what blocks are stored in the cache of tile 120. Tile 118 may store presence bit vector 136 of tile 120 in a fetch hint table 140. Fetch hint table 140 may include a tag field 142, a source field 144 and/or a source presence bit vector field 146. Source field 144 may identify the source of the presence bit vector—such as tile 120 in the example. Similarly, tile 118 may store a presence bit vector 136 indicating blocks of a corresponding region that are stored in tile 118.

In examples where tile 118 subsequently requests a particular block in a particular region, processor 112 of tile 118 may first analyze block coherence table 150 to determine if the particular block is stored in tile 118. In examples where there is no indicator associated with the particular block in the block coherence table, processor 112 may then analyze region tag coherence table 130 to determine whether there is an indicator that blocks in the particular region may be stored in other caches. In examples where region coherence table 130 includes an indicator that another tile is storing blocks in the particular region, tile 118 may further analyze fetch hint table 140 to determine whether there is an indication of the presence bit vector of the other tile. Tile 118 may further analyze the presence bit vector to determine whether the presence bit vector indicates that the other tile is storing the particular block.

Based on the analysis of region coherence table 130 and fetch hint table 140, processor 112 may send the request for the particular block to the other tile (bypassing the directory), in examples where the presence bit vector indicates that the other tile is storing the particular block. Processor 112 may send the request for the particular block to directory 114, in examples where region coherence table 130 indicates that the particular region is stored in the other tile but tile 118 does not have the presence bit vector of the other tile. Processor 112 may send the request for the particular block to memory controller 188 in examples where region coherence table 130 indicates that the particular region is stored in the other tile (shared—SRO) and the presence bit vector indicates that the particular block is not stored in the other tile.

In examples when directory controller 138 changes a region coherence state to MX indicating that blocks in the region have mixed coherence states, region coherence may not apply and a block based coherence may be used. Directory 114 may include a list of blocks stored in die 102, along with a state of the block and which caches may be sharing the block. For example, directory 114 may use a MESI, MOESI, MSI, MOSI etc. protocols. In these type of protocols, directory 114 may keep track of sharing states such as: modified (M) such as when a cache line has been modified since the line has been moved from a main memory; exclusive (E) such as when a cache line is only in one cache but the line matches a main memory; exclusive-modified (EM) such as when as cache line is modified and exclusive to a cache; shared (S) such as when the cache line may be stored in other caches and the line matches the main memory; invalid (I) such as when the cache line is invalid; and/or owned (O) such as when the indicated cache line includes the most recent copy of the data.

Directory 114 may further include a block coherence table 190. Block coherence table 190 may include a tag field 192, a state field 194 and/or a sharers field 196. In examples, where a region coherence changes state to MX, block coherence table 190 may be populated in a variety of methods. For example, for a particular region that changes to MX coherence state, blocks in the particular region, along with respective coherence states, may be populated into block coherence table 190. If a prior coherence state was PRO or PRW, the state field may be populated with the EM coherence state. If a prior coherence state was SRO, the state field may be populated with the S coherence state with the list of sharing caches being populated from the region directory's list of sharers field.

In an another example, when a region changes coherence state to MX, directory controller 138 may send a message to tiles identified in the list of sharers field. Tiles may be configured to respond with their respective presence bit vectors for the region that transitioned to MX. Directory controller 138 may then populate block coherence table 190 with blocks that are indicated as being cached in the respective presence bit vector.

Among other possible benefits, a system in accordance with the disclosure may be used to implement a cache coherence protocol for a region of blocks without necessarily involving a directory or an operating system. Power consumption and latency may be saved because of less use of a directory and more intelligent use of cores. A size of a directory may be decreased as the directory may maintain a state of a region and not necessarily a state of every block. The directory may be involved for coherence relating to data shared among cores and need not be used for data that is private to a core or read only. As some requests for data may be from one tile to another, a shorter communication distance may be achieved.

Figure 4:
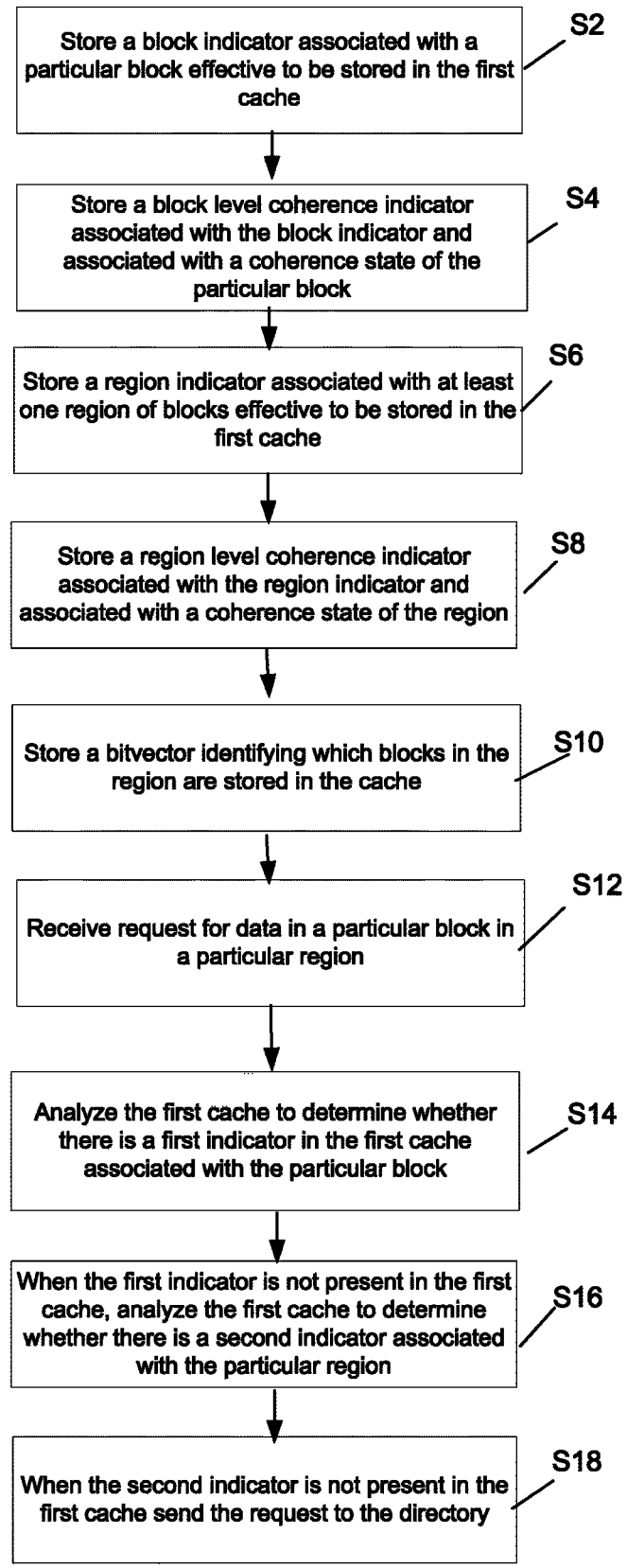
FIG. 4 depicts a flow diagram for an example process for implementing multi-granular cache coherence.

FIG. 4 depicts a flow diagram for an example process for implementing multi-granular cache coherence arranged in accordance with at least some embodiments described herein. In some examples, the process in FIG. 4 could be implemented using system 100 discussed above. In an example, a method or process for maintaining coherence in a multi-core processor on a die may be implemented. The die may include a first tile including a first cache and a first processor core. The die may further include a second tile configured in communication with the first tile. The second tile may include a second cache and a second processor core. The die may include a memory storing a directory configured in communication with the first tile and the second tile.

An example process may include one or more operations, actions, or functions as illustrated by one or more of blocks S2, S4, S6, S8, S10, S12, S14, S16 and/or S18. Although illustrated as discrete blocks, various blocks may be divided into additional blocks, combined into fewer blocks, or eliminated, depending on the desired implementation.

Processing may begin at block S2, "Store a block indicator associated with a particular block effective to be stored in the first cache." At block S2, a processor, in the first tile may be configured to store, in the first cache, a first indicator associated with a particular block (e.g., the block's tag) to be stored in the first cache. The processor may operate based on instructions received from a directory controller associated with the directory.

Processing may continue from block S2 to block S4, "Store a block level coherence indicator associated with the block indicator and associated with a coherence state of the particular block." At block S4, the processor may be configured to store a first coherence indicator associated with the first indicator and with the first coherence state of the particular block. For example, coherence states such as shared, exclusive, modified, etc. may be used by the processor.

Processing may continue from block S4 to block S6, "Store a region indicator associated with at least one region of blocks effective to be stored in the first cache." At block S6, the processor may be configured to store a second indicator. The second indicator may be associated with at least one region of blocks effective to be stored in the first cache. For example, a region of blocks including the particular block, such as a region including 4 kb of data, may be associated with the second indicator.

Processing may continue from block S6 to block S8, "Store a region level coherence indicator associated with the region indicator and associated with a coherence state of the region." At block S8, the processor may be configured to store a second coherence indicator associated with the second indicator of the region and associated with a second coherence state of the region. For example, coherence states relating to whether the data in the region is private, shared, etc. as discussed herein may be used.

Processing may continue from block S8 to block S10, "Store a bitvector identifying which blocks in the region are stored in the cache." At block S10, the processor may further be configured to a store a bit vector indicating which blocks of the region are stored in the first tile. The bitvector may be sent to other tiles in response to requests for blocks stored in the first tile.

Processing may continue from block S10 to block S12, "Receive request for data in a particular block in a particular region." At block S12, the processor may receive a request for data in a particular block in a particular region.

Processing may continue from block S12 to block S14, "Analyze the first cache to determine whether there is a first indicator in the first cache associated with the particular block." At block S12, in response to the request for data, the processor may be configured to analyze the cache and determine whether the first indicator associated with the particular block is stored. In examples where the indicator associated with the particular block is stored, the processor may retrieve the particular block from the cache.

Processing may continue from block S14 to block S16, "When the first indicator is not present in the first cache, analyze the first cache to determine whether there is a second indicator associated with the particular region." At block S14, the processor may be configured to, when the first indicator is not present, analyze the cache to determine whether the second indicator corresponding to the particular region is present. The second indicator may indicate whether data in the particular region is stored in the first cache.

Processing may continue from block S16 to block S18, "When the second indicator is not present in the first cache send the request to the directory." At block S18, the processor may, when the second indicator is determined to be not present in the first cache, send the request for the particular block to the directory.

Figure 5:
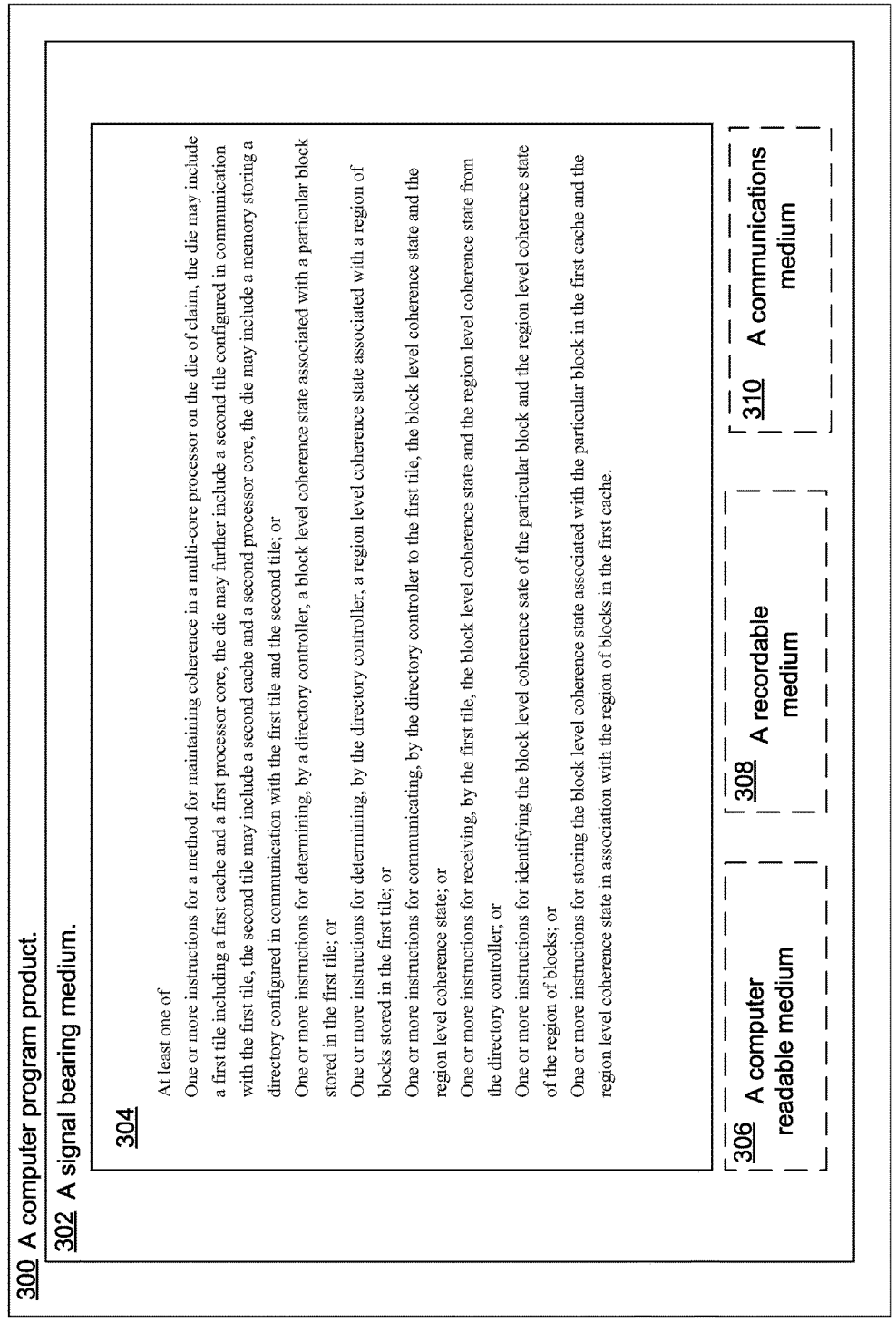
FIG. 5 illustrates a computer program product that can be utilized to implement multi-granular cache coherence.

FIG. 5 illustrates an example computer program product 300 that can be utilized to implement multi-granular cache coherence arranged in accordance with at least some embodiments described herein. Computer program product 300 may include a signal bearing medium 302. Signal bearing medium 302 may include one or more instructions 304 that, when executed by, for example, a processor, may provide the functionality described above with respect to FIGS. 1-4. Thus, for example, referring to system 100, one or more of processors 112 in tiles 118, 124 or 124 may undertake one or more of the blocks shown in FIG. 5 in response to instructions 304 conveyed to the system 100 by signal bearing medium 302.

In some implementations, signal bearing medium 302 may encompass a computer-readable medium 306, such as, but not limited to, a hard disk drive (HDD), a Compact Disc (CD), a Digital Video Disk (DVD), a digital tape, memory, etc. In some implementations, signal bearing medium 302 may encompass a recordable medium 308, such as, but not limited to, memory, read/write (R/W) CDs, R/W DVDs, etc. In some implementations, signal bearing medium 302 may encompass a communications medium 310, such as, but not limited to, a digital and/or an analog communication medium (e.g., a fiber optic cable, a waveguide, a wired communication link, a wireless communication link, etc.). Thus, for example, computer program product 300 may be conveyed to one or more modules of the system 100 by an RF signal bearing medium 302, where the signal bearing medium 302 is conveyed by a wireless communications medium 310 (e.g., a wireless communications medium conforming with the IEEE 802.11 standard).

FIG. 6 is a block diagram illustrating an example computing device 400 that is arranged to implement multi-granular cache coherence arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor ($\mu$P), a microcontroller ($\mu$C), a digital signal processor (DSP), or any combination thereof. Processor 404 may include one or more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a multi-granular cache coherence algorithm 426 that is arranged to perform the functions as described herein including those described with respect to system 100 of FIGS. 1-3. Program data 424 may include multi-granular cache coherence data 428 that may be useful to implement multi-granular cache coherence as is described herein. In some embodiments, application 422 may be arranged to operate with program data 424 on operating system 420 such that multi-granular cache coherence may be provided. This described basic configuration 402 is illustrated in FIG. 6 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A die in a multi-core processor architecture, the die comprising:
    a first tile that includes a first cache and a first processor core, wherein the first tile is configured to store a particular block and a region of blocks, and wherein the region of blocks includes two or more blocks;
    a second tile configured in communication with the first tile, wherein the second tile includes a second cache and a second processor core; and
    a directory controller configured in communication with the first tile and the second tile,
    wherein the directory controller is effective to control a directory for the die,
    wherein the directory controller is configured to:
        determine a block level coherence state associated with the particular block;
        determine a region level coherence state associated with the region of blocks, wherein the region level coherence state is based on a respective block level coherence state of each respective block among the two or more blocks of the region of blocks; and
        communicate, to the first tile, the block level coherence state associated with the particular block and the region level coherence state associated with the region of blocks, and
    wherein the first tile is configured to:
        receive the block level coherence state associated with the particular block and the region level coherence state associated with the region of blocks from the directory controller;
        identify the block level coherence state associated with the particular block and the region level coherence state associated with the region of blocks; and
        store the block level coherence state associated with the particular block in the first cache and the region level coherence state associated with the region of blocks in the first cache.

2. The die of claim 1, further comprising a memory that includes the directory, which is configured in communication with the first tile and the second tile, wherein the directory includes:
    a region indicator associated with the region;
    a region coherence indicator associated with the region indicator and associated with the region level coherence state; and
    a cache indicator associated with the region indicator and associated with at least the first cache.

3. The die of claim 1, further comprising a memory that includes the directory, which is configured in communication with the first tile and the second tile, wherein the directory includes:
    a region indicator associated with the region;
    a region coherence indicator associated with the region indicator and associated with the region level coherence state;
    a cache indicator associated with the region coherence indicator and associated with at least the first cache;
    a block indicator associated with the particular block;
    a block coherence indicator associated with the block indicator and associated with the block level coherence state associated with the particular block; and
    a cache indicator associated with the block coherence indicator and associated with the first cache.

4. The die of claim 1, further comprising a memory that includes the directory, which is configured in communication with the first tile and the second tile, wherein the directory includes:
    a region indicator associated with at least the region;
    a region coherence indicator associated with the region indicator and associated with the region level coherence state;
    a cache indicator associated with the region coherence indicator and associated with at least the first cache;
    a first indicator associated with the cache indicator and associated with a number of blocks of the region effective to be stored in an exclusive or a modified coherence state; and
    a second indicator associated with the first indicator and associated with a number of blocks of the region effective to be stored in a shared coherence state or a number of blocks of the region that are not stored in any cache in the die.

5. The die of claim 1, wherein the region includes a first region, and wherein the first cache is further adapted to include:
    a first indicator associated with a second region;
    a second indicator associated with the first indicator and associated with the second tile, wherein the second tile is effective to store at least one block of the second region; and a bit vector associated with the second indicator, wherein the bit vector is effective to indicate that the at least one block of the second region is effective to be stored by the second tile.

6. The die of claim 1, wherein the region includes between about 512 B and about 16 kb of memory.

7. The die of claim 1, wherein the directory controller is configured to communicate the block level coherence state and the region level coherence state by generation of a message that includes the block level coherence state and the region level coherence state.

8. The die of claim 1, wherein the directory controller is effective to monitor traffic on the die and, in response, determine the block level coherence and determine the region level coherence.

9. A method to maintain coherence in a multicore processor on a die, wherein the die includes a first tile including a first cache and a first processor core, wherein the die further includes a second tile configured in communication with the first tile, and wherein the second tile includes a second cache and a second processor core, the method comprising:
determining, by a directory controller, a block level coherence state associated with a particular block stored in the first tile;
determining, by the directory controller, a region level coherence state associated with a region of blocks stored in the first tile, wherein the region of blocks includes two or more blocks, and wherein the region level coherence state is based on a respective block level coherence state of each respective block among the two or more blocks of the region of blocks;
communicating, by the directory controller to the first tile, the block level coherence state associated with the particular block and the region level coherence state associated with the region of blocks;
receiving, by the first tile, the block level coherence state associated with the particular block and the region level coherence state associated with the region of blocks from the directory controller;
identifying the block level coherence state associated with the particular block and the region level coherence state associated with the region of blocks; and
storing the block level coherence state associated with the particular block in the first cache and the region level coherence state associated with the region of blocks in the first cache.

10. The method of claim 9, further comprising:
storing, in a directory, a region indicator associated with the region;
storing, in the directory, a region coherence indicator associated with the region indicator and associated with the region level coherence state; and
storing, in the directory, a cache indicator associated with the region coherence indicator and associated with at least the first cache.

11. The method of claim 9, further comprising:
storing, in a directory, a region indicator associated with the region;
storing, in the directory, a region coherence indicator associated with the region indicator and associated with the region level coherence state;
storing, in the directory, a cache indicator associated with the region coherence indicator and associated with at least the first cache;
storing, in the directory, a block indicator associated with the particular block;
storing, in the directory, a block coherence indicator associated with the block indicator and associated with the block level coherence state associated with the particular block; and
storing, in the directory, a cache indicator associated with the first cache.

12. The method of claim 9, further comprising:
storing, in a directory, a region indicator associated with at least the region;
storing, in the directory, a region coherence indicator associated with the region indicator and associated with the region level coherence state;
storing, in the directory, a cache indicator associated with the region coherence indicator and associated with at least the first cache;
storing, in the directory, a first indicator associated with the cache indicator and associated with a number of blocks of the region effective to be stored in an exclusive coherence state or a modified coherence state; and
storing, in the directory, a second indicator associated with the first indicator and associated with a number of blocks of the region effective to be stored in a shared coherence state or a number of blocks in the region that are not stored in any cache in the die.

13. The method of claim 9, wherein the region includes a first region, and wherein the method further comprises:
storing, in the first cache, a first indicator associated with a second region;
storing, in the first cache, a second indicator associated with the first indicator and associated with the second tile, wherein the second tile is effective to store at least one block of the second region; and
storing, in the first cache, a bit vector associated with the second indicator, wherein the bit vector is effective to indicate that the at least one block of the second region is effective to be stored by the second tile.

14. The method of claim 9, wherein communicating the block level coherence state and the region level coherence state includes generating a message that includes the block level coherence state and the region level coherence state.

15. The method of claim 9, further comprising monitoring traffic on the die by the directory controller and, in response, determining the block level coherence and determining the region level coherence.

16. A method to process a request for a particular block in a particular region in a multi-core processor on a die, wherein the die includes a first tile including a first cache and a first processor, wherein the die further includes a second tile configured in communication with the first tile, and wherein the second tile includes a second cache and a second processor, the method comprising:
analyzing, by the first processor, the first cache to determine whether there is a block indicator in the first cache associated with the particular block;
in response to determination by the first processor that the block indicator is absent in the first cache, analyzing, by the first processor, the first cache to determine whether there is a region indicator associated with the particular region, wherein: the particular region includes two or more blocks, the two of more blocks include the particular block, the region indicator is associated with a region level coherence state of the particular region, and the region level coherence state of the particular region is based on a respective block level coherence state of each respective block among the two or more blocks of the particular region; and in response to determination by the first processor that the region indicator is absent in the first cache, sending, by the first processor, the request to a directory.

17. The method of claim 16, further comprising:
in response to determination by the first processor that the region indicator is present in the first cache, sending, by the first processor, the request to a memory controller if the region indicator is associated with a private coherence state.

18. The method of claim 17, wherein:
the block indicator includes a first block indicator, and
in response to determination that the region indicator is absent in the first cache, the first processor is effective to send the request to the directory, and the method further comprises:
analyzing, by a directory controller, the directory to determine whether there is a second block indicator of the particular block in the directory;
in response to determination by the directory controller that there is the second block indicator for the particular block in the directory, identifying, by the directory controller, the second cache as being associated with the particular block;
sending, by the directory controller, the request to the second tile;
receiving the request by the second tile;
sending the particular block from the second cache to the first cache; and
sending a bit vector from the second cache to the first cache, wherein the bit vector is effective to indicate at least one block of the particular region stored by the second cache.

19. The method of claim 17, wherein:
the block indicator includes a first block indicator,
the region indicator includes a first region indicator,
the request includes a first request,
the particular block includes a first particular block,
the particular region includes a first particular region,
in response to a determination that the region indicator is absent in the first cache, the first processor is effective to send the first request to the directory, and the method further comprises:
analyzing, by a directory controller, the directory to determine whether there is a second block indicator of the first particular block in the directory;
in response to determination by the directory controller that there is the second block indicator for the first particular block in the directory, identifying, by the directory controller, the second cache as being associated with the first particular block;
sending, by the directory controller, the first request to the second tile;
receiving the first request by the second tile;
sending the first particular block from the second cache to the first cache;
sending a bit vector from the second cache to the first cache, wherein the bit vector is effective to indicate at least one block of the first particular region stored by the second cache;
receiving, by the first processor, a second request for a second particular block in a second particular region;
analyzing, by the first processor, the first cache to determine whether there is a third block indicator in the first cache associated with the second particular block;
in response to determination by the first processor that the third block indicator is absent in the first cache, analyzing, by the first processor, the first cache to determine whether there is a second region indicator associated with the second particular region;
in response to determination by the first processor that the second region indicator is present in the first cache, analyzing the bit vector to determine whether the second cache is storing the second particular block; and
in response to determination by the first processor that the second cache is storing the second particular block, sending the second request to the second cache.

20. The method of claim 17, wherein:
the block indicator includes a first block indicator,
the region indicator includes a first region indicator,
the request includes a first request,
the particular block includes a first particular block,
the particular region includes a first particular region,
in response to a determination that the region indicator is absent in the first cache, the first processor is effective to send the first request to the directory, and the method further comprises:
analyzing, by a directory controller, the directory to determine whether there is a second block indicator of the first particular block in the directory;
in response to determination by the directory controller that there is the second block indicator for the first particular block in the directory, identifying, by the directory controller, the second cache as being associated with the first particular block;
sending, by the directory controller, the first request to the second tile;
receiving the first request by the second tile;
sending the first particular block from the second cache to the first cache;
sending a bit vector from the second cache to the first cache, wherein the bit vector is effective to indicate at least one block of the first particular region stored by the second cache;
receiving, by the first processor, a second request for a second particular block in a second particular region;
analyzing, by the first processor, the first cache to determine whether there is a third block indicator in the first cache associated with the second particular block;
in response to determination by the first processor that the third block indicator is absent in the first cache, analyzing, by the first processor, the first cache to determine whether there is a second region indicator associated with the second particular region;
in response to determination by the first processor that the second region indicator is present in the first cache, analyzing the bit vector to determine whether the second cache is storing the second particular block; and
in response to determination by the first processor that the second particular block is absent in the second cache sending the second request to a memory controller.

21. The method of claim 16, further comprising:
in response to determination by the first processor that the region indicator is present in the first cache, sending, by the first processor, the request to the second tile if the region indicator is associated with a shared coherence state.

22. The method of claim 16, wherein:
the region indicator includes a first region indicator, and in response to determination by the first processor that the first region indicator is present in the first cache, and that the first region indicator relates to a shared coherence state, the method further comprises:
- analyzing, by the first processor, the first cache to determine whether there is a second region indicator associated with the particular region, a tile indicator of the second tile related to the second region indicator, and a bit vector, wherein the bit vector is effective to indicate at least some blocks of the particular region effective to be stored by the second tile; and
- in response to determination by the first processor that the second region indicator is absent in the first cache or that the bit vector fails to indicate the particular block, sending the request to a memory controller.

23. The method of claim 16, wherein:
the region indicator includes a first region indicator, and
in response to determination by the first processor that the first region indicator is present in the first cache, and that the region indicator relates to a shared coherence state, the method further comprises:
- analyzing, by the first processor, the first cache to determine whether there is a second region indicator associated with the particular region, a tile indicator of a second tile related to the second region indicator, and a bit vector tile, wherein the bit vector is effective to indicate at least some blocks of the particular region effective to be stored by the second tile; and
- in response to determination by the first processor that the bit vector indicates the particular block, sending the request to the second tile.

24. The method of claim 16, wherein:
the block indicator includes a first block indicator, and
after the first processor sends the request to the directory, the method further comprises:
- analyzing, by a directory controller, the directory to determine whether there is a second block indicator of the particular block in the directory;
- in response to determination by the directory controller that there is the second block indicator for the particular block in the directory, identifying, by the directory controller, the second cache as being associated with the particular block; and
- sending, by the directory controller, the request to the second tile.

* * * * *

UNITED STATES PATENT AND TRADEMARK OFFICE
CERTIFICATE OF CORRECTION

PATENT NO. : 9,772,950 B2
APPLICATION NO. : 14/437331
DATED : September 26, 2017
INVENTOR(S) : Solihin Page 1 of 1

It is certified that error appears in the above-identified patent and that said Letters Patent is hereby corrected as shown below:

In the Specification

Column 5, Line 55, delete "PRW Changes" and insert -- PRW. Changes --, therefor.

Column 7, Line 64, delete "(0)" and insert -- (O) --, therefor.

Signed and Sealed this
Seventeenth Day of April, 2018

Andrei Iancu
*Director of the United States Patent and Trademark Office*